United States Patent
Poles et al.

(10) Patent No.: US 7,843,255 B2
(45) Date of Patent: Nov. 30, 2010

(54) CHARGE PUMP REGULATOR AND CIRCUIT STRUCTURE

(75) Inventors: Marco Poles, Ghedi (IT); Marco Pasotti, Travaco' Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 381 days.

(21) Appl. No.: 11/966,117

(22) Filed: Dec. 28, 2007

(65) Prior Publication Data

US 2008/0174288 A1     Jul. 24, 2008

(30) Foreign Application Priority Data

Dec. 28, 2006   (IT) .......................... MI2006A2517

(51) Int. Cl.
    *G05F 1/10*   (2006.01)
(52) U.S. Cl. ...................................... 327/540; 323/285
(58) Field of Classification Search ............. 327/113, 327/140.536–543, 551; 323/272–276, 282–286, 323/224, 314; 365/185.18, 185.23
    See application file for complete search history.

(56) References Cited

U.S. PATENT DOCUMENTS

| 6,066,943 | A  | * | 5/2000  | Hastings et al. | ............. 323/285 |
| 7,005,838 | B2 | * | 2/2006  | Tobita          | ........................ 323/314 |
| 7,075,359 | B2 | * | 7/2006  | Chen            | ........................... 327/541 |
| 7,279,961 | B2 | * | 10/2007 | Chan et al.     | ................... 327/540 |

FOREIGN PATENT DOCUMENTS

EP      1 408 604  A1    4/2004

* cited by examiner

*Primary Examiner*—Rajnikant B Patel
(74) *Attorney, Agent, or Firm*—Lisa K. Jorgenson; Robert Iannucci; Seed IP Law Group PLLC

(57) ABSTRACT

There is disclosed a regulator for a charge pump having an input signal and generating an output signal at a value greater than the input signal. The charge pump comprises at least a capacitor and at least a device for charging and discharging the capacitor; the regulator comprises means having at the input said signal exiting the charge pump and a reference signal. Said means are able to generate a supply signal for said at least a device in response to the value of the difference between the output signal of the charge pump and said reference signal.

23 Claims, 4 Drawing Sheets

CHARGE PUMP REGULATOR AND CIRCUIT STRUCTURE

BACKGROUND

1. Technical Field

The present disclosure relates to a regulator for a charge pump and a circuit that implements the regulator.

2. Description of the Related Art

A charge pump is a particular boosting circuit that is used to generate higher voltage than the supply voltage thereof. Normally, charge pumps are implemented in integrated circuits. In general, the operation of a charge pump is based on removing a significant charge quantity from the supply voltage and transferring the charge quantity to a series of capacitive stages that convey the charge quantity to the output. The frequency of this removal is determined by a regulating circuit that enables the output voltage to be fixed at the desired value.

Current regulating circuits compare the output voltage of the charge pump and a reference voltage. On the basis of this comparison, the regulating circuits supply the enabling signals to the various stages of the charge pump to remove the charge from one stage to a successive stage of the series, with a frequency variable between zero and a clock frequency set externally. In FIG. 1 there is shown a charge pump 1 with a regulating circuit 2 having an input voltage Vout exiting from charge pump 1 and a clock signal CK. The signal Ckin exiting from the regulator 2 enters the charge pump 1 that is supplied by a supply signal Vdd.

This operating principle has the advantage of maximizing the efficiency of the pump as it is switched on only when necessary. The drawback arises from the fact that the frequency of the removal of current from the supply depends on the load attached to the pump; in fact, transmitting enabling signals to low-frequency capacitive stages generally corresponds to a loadless pump status, i.e., to the absence of a load, whilst transmitting enabling signals to the high-frequency capacitive stages corresponds to a high request from the load. In FIG. 2 there are shown the time diagrams of the signals Ivdd, Vout and Iout.

This pattern leads to variable frequency absorption spikes on the supply, and this generates a wide-spectrum noise that is reflected in the entire integrated circuit supplied by the supply voltage. In FIG. 3 there is shown the frequency spectrum S of the current Ivdd.

A charge pump in which there are provided means for reducing noise is known from patent EP 1408604. The charge pump comprises a sequence of capacitive stages and means for transferring the electric charge from each capacitive block to the next capacitive block of the sequence. The transferring means are enabled alternatively during a first phase and a second phase. The charge pump includes means for limiting the current that runs through each capacitive stage during the first phase and the second phase.

BRIEF SUMMARY

In view of the foregoing, the present disclosure provides a regulator for a charge pump that reduces the noise in the charge pump.

According to one embodiment of the present disclosure, a regulator for a charge pump having an input signal and generating an output signal at a value greater than the input signal is provided, the charge pump including at least a capacitor and at least a device for charging and discharging the capacitor. The regulator includes means such as a circuit having at the input the output signal from the charge pump and a reference signal, the means adapted to generate a supply signal for at least one device in response to the value of the difference between the output signal of the charge pump and the reference signal.

In accordance with another embodiment of the present disclosure, a circuit structure is provided that includes a charge pump and a regulator of the charge pump, the charge pump having an input to receive an input signal and an output on which is generated an output signal at a value greater than the input signal, the charge pump having at least a capacitor and at least one device for charging and discharging the capacitor, said regulator comprising means having at the input said output signal from the charge pump and a reference signal, said means adapted to generate a supply signal for said at least one device in response to the value of the difference between said output signal of the charge pump and said reference signal.

In accordance with another aspect of the foregoing embodiment, the means includes an operational amplifier suitable for amplifying the difference between said output signal of the charge pump and said reference signal and a transistor driven by the output signal of said operational amplifier and having a non-drivable terminal connected to a further supply voltage and generating on said other non-drivable terminal said supply signal.

In accordance with another aspect of the foregoing embodiment, the charge pump includes a plurality of charge stages that each have at least one capacitor and at least one charging and discharging device for charging and discharging the capacitor, each of the charging and discharging devices receiving the signal from the regulator as a supply signal.

In accordance with another embodiment of the present disclosure, a regulator circuit for a charge pump having first, second, and third inputs and an output is provided. The regulator circuit includes an operational amplifier comprising a first input coupled to the output of the charge pump, a second input adapted to receive a voltage reference value, and an output; and a switch having a control terminal coupled to the output of the operational amplifier, a first terminal coupled to a supply voltage, and a second terminal coupled to a ground reference potential and to the first input of the charge pump.

In accordance with another aspect of the foregoing embodiment, the regulator circuit includes a voltage divider coupled between the output of the charge pump and the first input of the operational amplifier.

In accordance with another aspect of the foregoing embodiments, the regulator circuit includes a first compensation capacitor coupled between the output of the operational amplifier and the output of the charge pump, and a second compensation capacitor coupled between the output of the operational amplifier and the second terminal of the switch.

In accordance with another embodiment of the present disclosure, a circuit is provided that includes a charge pump having an input adapted to receive an input signal and an output for an output signal having a voltage value greater than the input signal at the input of the charge pump; and a regulator circuit that includes an operational amplifier having a first input coupled to the output of the charge pump, a second input adapted to receive a voltage reference value, and an output; and a switch having a control terminal coupled to the output of the operational amplifier, a first terminal coupled to a supply voltage, and a second terminal coupled to a ground reference potential and to the first input of the charge pump.

In accordance with another aspect of the foregoing embodiment, the charge pump has an input to receive an input signal and an output on which is generated an output signal at a value greater than the input signal. In addition, the charge pump includes at least a capacitor and at least one device for charging and discharging the capacitor. The charging and discharging device preferably receives as a supply voltage an output of the switch.

In accordance with another aspect of the foregoing embodiment, the charge pump includes a plurality of charge stages each including at least one capacitor and the at least one device for discharging and charging the capacitor, the signal generated by the regulator being the supply signal of each of the at least one devices and the input signal of only the first stage of the charge pump.

In accordance with another aspect of the foregoing embodiment, the regulator circuit includes a voltage divider coupled between the output of the charge pump and the first input of the operational amplifier. Ideally, compensation capacitors are coupled between the output of the operational amplifier and the output of the charge pump and between the output of the operational amplifier and the second terminal of the switch.

BRIEF DESCRIPTION OF THE SEVERAL VIEWS OF THE DRAWINGS

The features and the advantages of the present disclosure will be clear from the following detailed description of practical embodiments thereof, illustrated by way of non-limiting example in the following attached drawings, in which.

DETAILED DESCRIPTION

Figure 1:
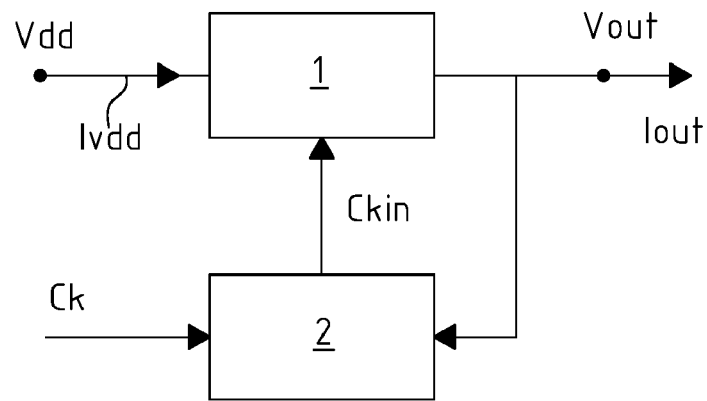
FIG. 1 shows a traditional diagram of a charge pump circuit.
Figure 2:
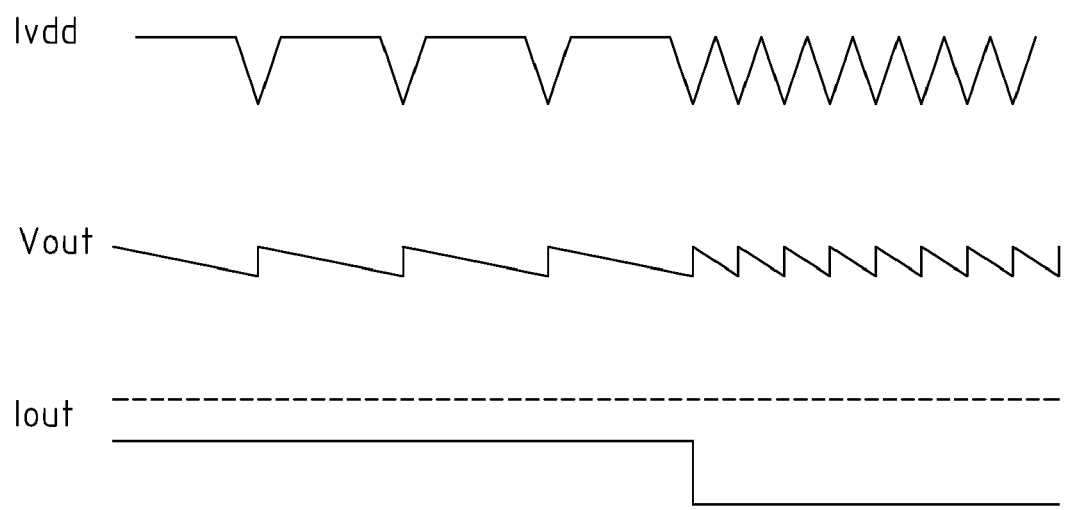
FIG. 2 shows the time diagrams of signals in the circuit in FIG. 1.
Figure 3:
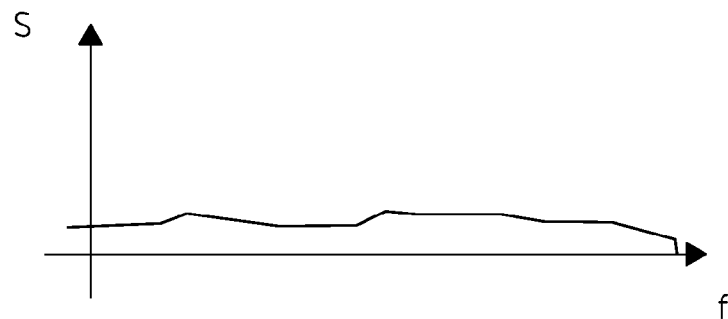
FIG. 3 shows the frequency spectrum of the current Ivdd.
Figure 4:
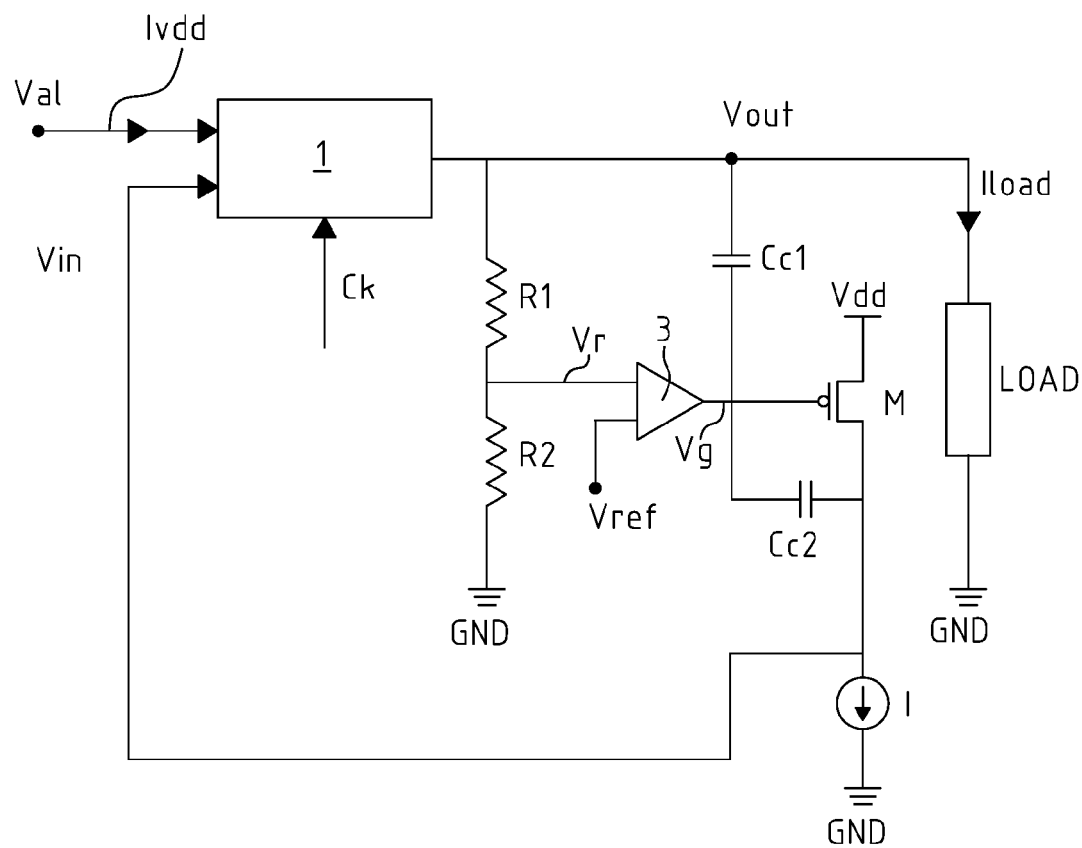
FIG. 4 shows a charge pump with a regulator according to the present disclosure.

In FIG. 4 there is shown a regulator circuit for a charge pump 1 according to one embodiment of the present disclosure. The charge pump 1 has an input signal Val and supplies with voltage Vout a load LOAD that is connected to ground GND and in which a current "Iload" flows. The regulator circuit includes a series of resistances R1 and R2 arranged between the voltage Vout exiting the charge pump 1 and the ground GND, a differential amplifier 3 suitable for amplifying the difference between the voltage Vr=Vout*R2/(R1+R2) and a reference voltage Vref and suitable for driving, by means of the output signal Vg, a transistor M, for example a PMOS transistor, having the source terminal connected to the supply voltage Vdd and the drain terminal connected to a current generator I connected in turn to ground GND. There are the compensating capacitors Cc1 and Cc2 respectively arranged between the voltage Vout and the voltage Vg and the voltage Vg and the drain terminal of the transistor M. The regulator generates a voltage Vin on the drain terminal that is in input to the charge pump 1.

Figure 6:
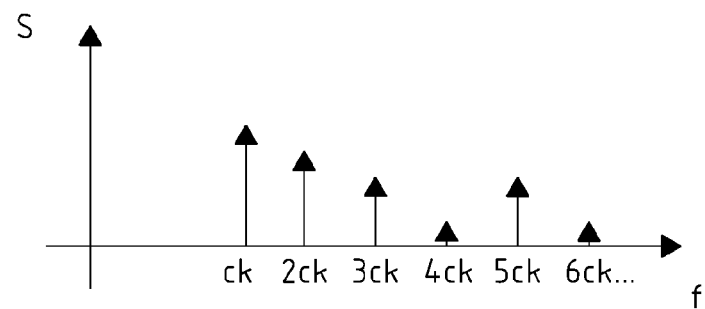
FIG. 6 shows a frequency spectrum of the current Ivdd in the circuit in FIG. 4.

In this case the regulator supplies to the charge pump 1 a variable input supply voltage Vin and the charge pump operates at a fixed operating frequency CK. In this manner the frequency spectrum S of the current Ivdd has multiple-frequency harmonics of CK, as visible in FIG. 6.

Figure 5:
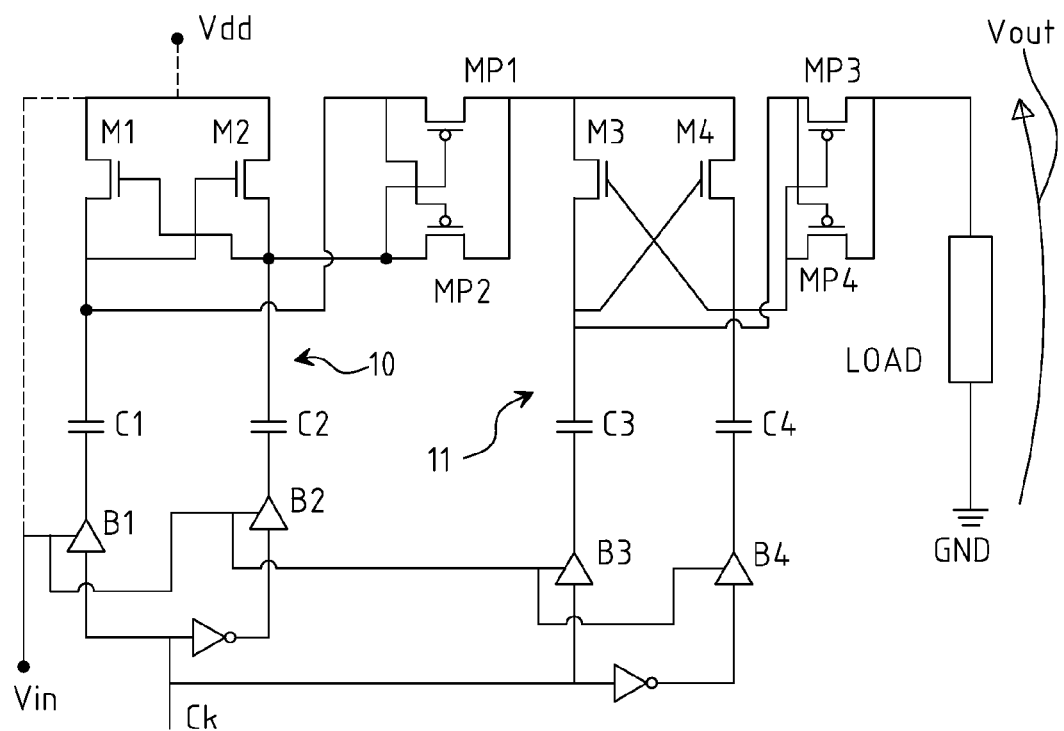
FIG. 5 shows the charge pump in FIG. 4 in greater detail.

In FIG. 5 there is shown a charge pump with two stages 10 and 11. Stage 10 comprises a charge stage comprising two MOS transistors M1 and M2, as shown in FIG. 5 NMOS transistors, that have the gate terminals connected respectively to the drain terminals of the transistor M2 and to the drain terminal of the transistor M1. The drain terminals of the transistors M1 and M2 are respectively connected to two capacitors C1 and C2 connected to two devices B1 and B2 having respectively the input signal Ck and the negated input signal Ck and being suitable for charging and draining the capacitors C1 and C2. The source terminals of the transistors M1 and M2 are connected to the voltage Vdd, which is the voltage Val of FIG. 4. According to this embodiment, the devices B1 and B2 are supplied by the signal Vin exiting from the regulator.

Stage 11 includes a charge stage that includes two MOS transistors M3 and M4, as shown in FIG. 5 to be PMOS transistors, that have the gate terminals connected respectively to the drain terminal of the transistor M4 and to the drain terminal of the transistor M3. The drain terminals of the transistors M3 and M4 are respectively connected to two capacitors C3 and C4 connected to two devices B3 and B4 having respectively the input signal Ck, and the negated input signal Ck which are suitable for charging and discharging the capacitors C3 and C4. According to the disclosure the devices B3 and B4 are supplied by the signal Vin exiting from the regulator. The source terminals of the transistors M3 and M4 are in common.

Between the output of stage 10 and the input of stage 11 there is arranged a circuit having two PMOS transistors MP1 and MP2; the drain terminal of the transistor MP1 is connected to the gate terminal of the transistor MP2 and to the gate terminal of the transistor M2 whilst the drain terminal of the transistor MP2 is connected to the gate terminal of the transistor MP1 and to the gate terminal of the transistor M1 and the source terminals are in common and connected to the source terminals of the transistors M3 and M4.

At the output of stage 11 there is arranged a circuit having two PMOS transistors MP3 and MP4; the drain terminal of the transistor MP3 is connected to the gate terminal of the transistor MP4 and to the gate terminal of the transistor M4 whilst the drain terminal of the transistor MP4 is connected to the gate terminal of the transistor MP3 and to the gate terminal of the transistor M3 and the source terminals are in common and connected to a load LOAD on which there is located the output voltage Vout of the charge pump.

Thus with a charge pump having a plurality of n charge stages 10, 11 . . . 1n, the voltage Vin is suitable for supplying the devices B1, B2 . . . Bn of the single charge stages.

According to a version of this embodiment of the present disclosure, the voltage Vin is suitable for supplying the first stage of the charge pump alternatively to the voltage Vdd, as visible in FIG. 5 where the voltage Vin, indicated by a broken line, supplies the charge stage 10 instead of the voltage Vdd. More precisely, the voltage Vin supplies only the transistors M1 and M2 of the first charge stage 10, i.e., the "pumping structure" of the charge stage 10.

Figure 7:
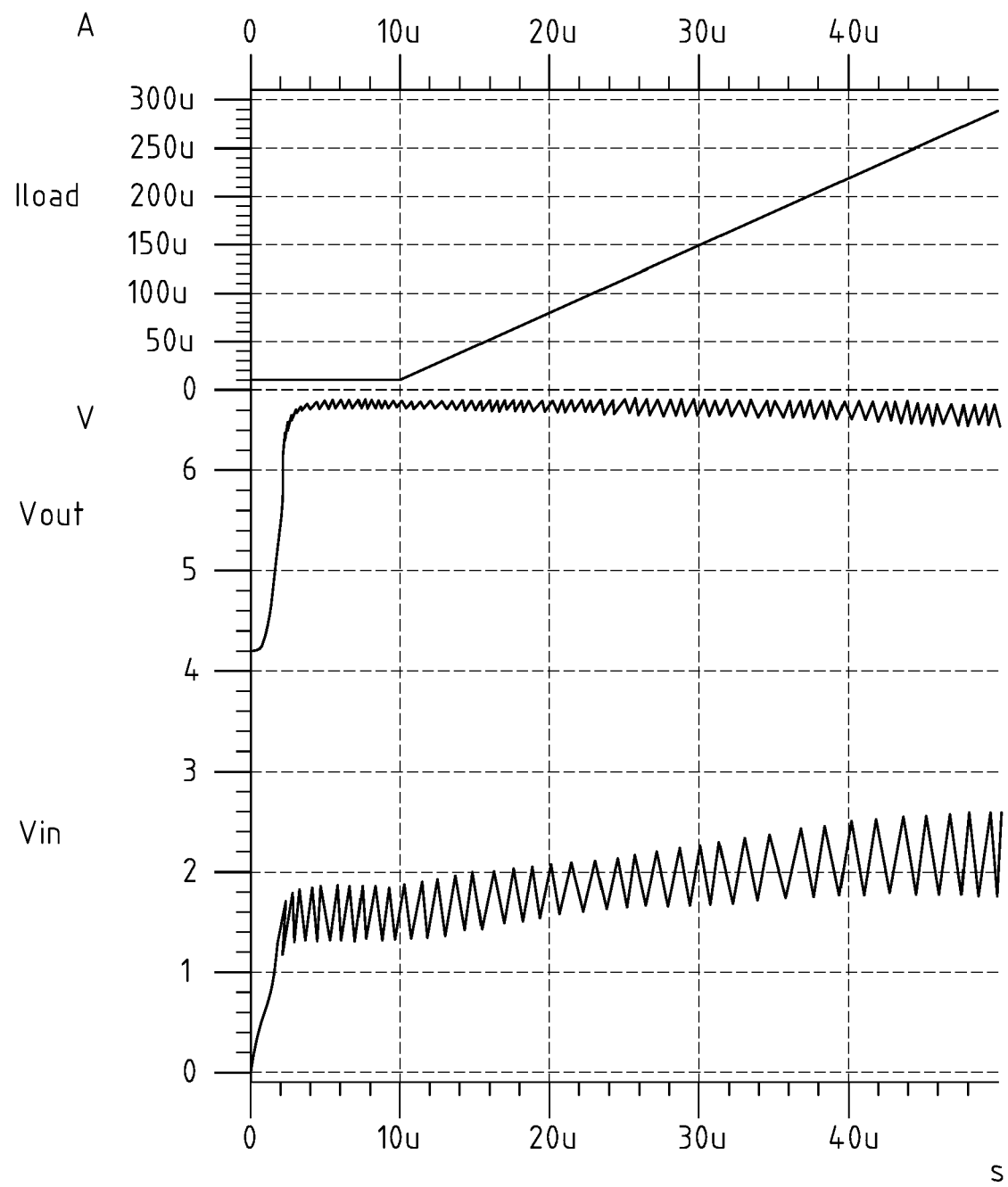
FIG. 7 shows the temporal pattern of the signals Vout and Iload as the signal Vin varies.

In FIG. 7 there are shown the time diagrams of the output voltage Vout, of the current on the load LOAD Iload, and of the voltage Vin. The current Iload increases on a ramp from 10 ua to 300 uA, the voltage Vout is maintained stable at a value of 6.5 Volt and the voltage Vin increases from a value of 1.8 Volt with Iload at 10 uA to a value of 2.3 Volt with Iload at 300 uA.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A regulator for a charge pump having a supply input and configured to generate a boosted electrical output quantity, said charge pump having a capacitor and a device configured to charge and discharge the capacitor, the regulator comprising:
    an input terminal configured to receive the boosted electrical output quantity from the charge pump; and
    means for generating an electrical supply quantity based on a difference between said boosted electrical output quantity and a reference electrical quantity, and for providing said electrical supply quantity to the supply input of the charge pump.

2. The regulator according to claim 1, wherein said means comprises:
    an operational amplifier suitable for amplifying the difference between said boosted electrical output quantity and the reference electrical quantity, and
    a transistor having a control terminal coupled to an output of said operational amplifier, first conduction terminal configured to receive a supply voltage, and a second conduction terminal configured to provide said electrical supply quantity.

3. A circuit structure, comprising:
    a charge pump configured to generate a boosted electrical output quantity, said charge pump comprising a supply input, a capacitor, and a device configured to charge and discharge the capacitor; and
    a regulator configured to regulate the charge pump, said regulator comprising:
        an input terminal configured to receive the boosted electrical output quantity; and
        means, having a first input coupled to receive said boosted electrical output quantity from the charge pump and a second input coupled to receive an electrical reference quantity, for generating an electrical supply quantity based on a difference between said boosted electrical output quantity and said electrical reference quantity and for providing said electrical supply quantity to the supply input of the charge pump.

4. The structure according to claim 3, wherein said means comprises:
    an operational amplifier suitable for amplifying the difference between said boosted electrical output quantity and said electrical reference quantity; and
    a transistor having a control terminal coupled to an output of said operational amplifier, a first conduction terminal configured to receive a supply voltage, and a second conduction terminal configured to provide said electrical supply quantity.

5. The structure according to claim 3, wherein said charge pump comprises a plurality of charge stages each comprising a supply input, a capacitor, and a device for discharging and charging said capacitor, each supply input being configured to receive said electrical supply quantity from the regulator.

6. The structure according to claim 3, wherein said charge pump comprises a plurality of charge stages each comprising a capacitor and a device configured to charge and discharge said capacitor, said charge stage being configured to receive the electrical supply quantity from the regulator.

7. The structure according to claim 3, wherein said device for charging and discharging said capacitor is configured to be driven by a fixed-frequency signal.

8. The structure according to claim 3, wherein said device comprises an inverter.

9. A regulator circuit for a charge pump having an input and an output, the regulator circuit comprising:
    an operational amplifier comprising a first input coupled to the output of the charge pump, a second input configured to receive a voltage reference value, and an output; and
    a switch having a control terminal coupled to the output of the operational amplifier, a first terminal coupled to a supply voltage terminal, and a second terminal coupled to a ground terminal and to the input of the charge pump.

10. The regulator circuit of claim 9, comprising a voltage divider coupled between the output of the charge pump and the first input of the operational amplifier.

11. The regulator circuit of claim 9, comprising a first compensation capacitor coupled between the output of the operational amplifier and the output of the charge pump, and a second compensation capacitor coupled between the output of the operational amplifier and the second terminal of the switch.

12. The regulator circuit of claim 11, comprising a current generator coupled between the second terminal of the switch and the ground terminal.

13. The regulator circuit of claim 12, comprising a voltage divider coupled between the output of the charge pump and the first input of the operational amplifier.

14. A circuit, comprising:
    a charge pump having an input configured to receive an electrical input quantity and an output, and configured to generate a boosted output voltage; and
    a regulator circuit comprising:
        an operational amplifier comprising a first input coupled to the output of the charge pump, a second input adapted to receive a voltage reference value, and an output; and
        a switch having a control terminal coupled to the output of the operational amplifier, a first terminal coupled to a supply voltage, and a second terminal coupled to a ground terminal and to the input of the charge pump.

15. The circuit of claim 14, wherein the charge pump comprises capacitor and a device configured to charge and discharge the capacitor, the device being coupled to the input of the charge pump to receive an electrical supply quantity from the switch.

16. The circuit of claim 14, wherein the charge pump comprises a plurality of charge stages, each charge stage comprising a capacitor and a charging and discharging device configured to charge and discharge the capacitor, each charging and discharging device being coupled to the input of the charge pump to receive an electrical supply quantity from the switch.

17. The circuit of claim 14, comprising a voltage divider coupled between the output of the charge pump and the first input of the operational amplifier.

18. The circuit of claim 14, comprising a first compensation capacitor coupled between the output of the operational amplifier and the output of the charge pump, and a second compensation capacitor coupled between the output of the operational amplifier and the second terminal of the switch.

19. The circuit of claim 18, comprising a voltage divider coupled between the output of the charge pump and the first input of the operational amplifier.

20. A regulator for a charge pump having an input and configured to generate a boosted electrical output quantity, said charge pump having a capacitor and a device configured to charge and discharge the capacitor, the regulator comprising:
   an input terminal configured to receive the boosted electrical output quantity from the charge pump; and
   means for generating an electrical quantity based on a difference between said boosted electrical output quantity and a reference electrical quantity, and for providing said electrical supply quantity to the input of the charge pump, wherein said means comprises:
      an operational amplifier suitable for amplifying the difference between said boosted electrical output quantity and the reference electrical quantity, and
      a transistor having a control terminal coupled to an output of said operational amplifier, a first conduction terminal configured to receive a supply voltage, and a second conduction terminal configured to provide said electrical quantity.

21. The regulator of claim 20, comprising a first compensation capacitor coupled between the output of the operational amplifier and the output of the charge pump, and a second compensation capacitor coupled between the output of the operational amplifier and the second terminal of the switch.

22. A circuit structure, comprising:
   a charge pump configured to generate a boosted electrical output quantity, said charge pump comprising an input, a capacitor, and a device configured to charge and discharge the capacitor; and
   a regulator configured to regulate the charge pump, said regulator comprising:
      an input terminal configured to receive the boosted electrical output quantity; and
      means, having a first input coupled to receive said boosted electrical output quantity from the charge pump and a second input coupled to receive an electrical reference quantity, for generating an electrical quantity based on a difference between said boosted electrical output quantity and said electrical reference quantity and for providing said electrical quantity to the input of the charge pump, wherein said means comprises:
         an operational amplifier suitable for amplifying the difference between said boosted electrical output quantity and said electrical reference quantity; and
         a transistor having a control terminal coupled to an output of said operational amplifier, a first conduction terminal configured to receive a supply voltage, and a second conduction terminal configured to provide said electrical quantity.

23. The circuit structure of claim 22, wherein the regulator includes a first compensation capacitor coupled between the output of the operational amplifier and the output of the charge pump, and a second compensation capacitor coupled between the output of the operational amplifier and the second terminal of the switch.

* * * * *